J. PIERPONT, S. S. TUTTLE & C. B. TOMPKINS.
HAND-CULTIVATOR.

No. 173,179. Patented Feb. 8, 1876.

Witnesses.
L. Van Rinvick.
Geo. R. Milburn.

Inventors:
Joshua Pierpont
Sidney S. Tuttle
Charles B. Tompkins

UNITED STATES PATENT OFFICE.

JOSHUA PIERPONT AND SIDNEY S. TUTTLE, OF BUSHNELL, AND CHARLES B. TOMPKINS, OF LEWISTON, ILLINOIS, ASSIGNORS TO PIERPONT AND TUTTLE.

IMPROVEMENT IN HAND-CULTIVATORS.

Specification forming part of Letters Patent No. 173,179, dated February 8, 1876; application filed November 4, 1875.

*To all whom it may concern:*

Be it known that we, JOSHUA PIERPONT and SIDNEY S. TUTTLE, of Bushnell, McDonough county, State of Illinois, and CHARLES B. TOMPKINS, of Lewiston, Fulton county, same State, have invented certain Improvements in Hand-Cultivators; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in cultivators of that class known as "hand-cultivators;" and the invention consists in certain new and useful combination of devices whereby such implements are rendered more useful and convenient to handle, all as hereinafter more fully set forth.

Figure 1:
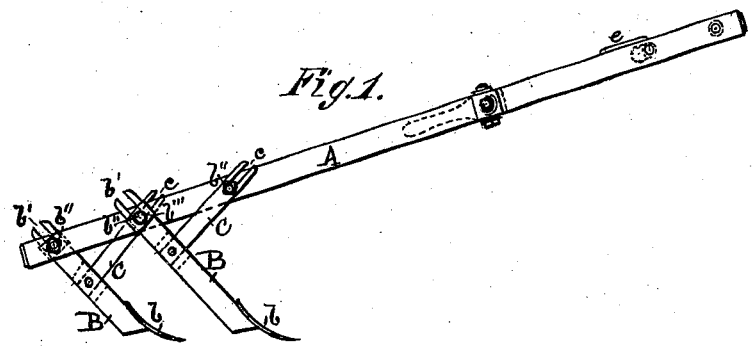
Figure 2:
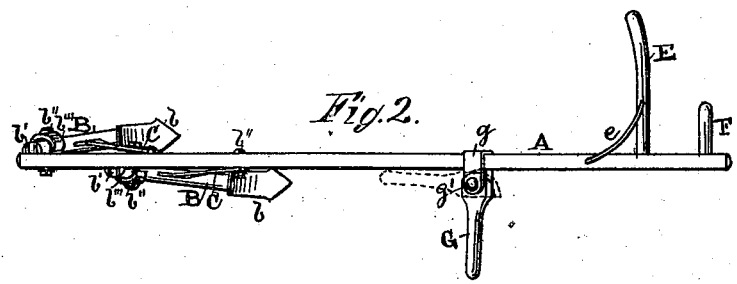
Figure 3:
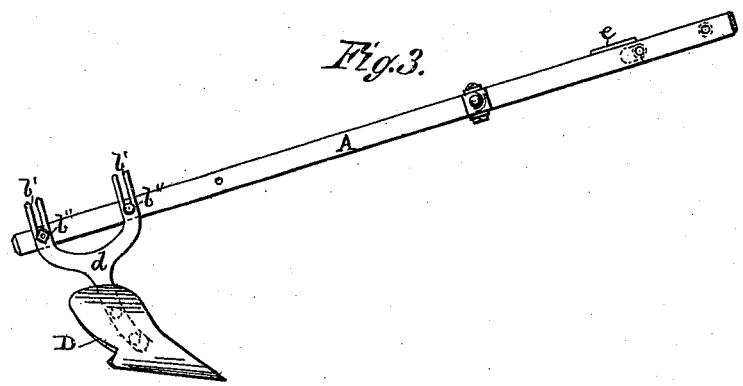

Figure 1 in the accompanying drawings is a side elevation of an implement embodying our invention. Fig. 2 is a top view, and Fig. 3 is also a side view, showing plows attached instead of cultivator teeth or shovels.

Referring to the parts by letters, letter A represents the tongue or main bar, to which the other parts are attached. B B are standards, having teeth or shovels $b$ at their lower ends, and their upper ends slotted, (see $b'$,) through which slot $b'$ a bolt, $b''$, passes, and also through the tongue A, and, in connection with clip-plates $b'''$, secure the standards to the tongue. C C are standard-braces, their lower ends pivoted to the standards B, and their upper ends having slots $c$, through which bolts $b''$ pass, for securing them to the tongue A. D represents a blade, something similar in shape to a turning-plow, and is carried at the lower end of a branched arm, $d$, the upper or branched ends corresponding in distance apart with the distance between the bolts $b''$, and each arm slotted at its upper end similar to slots $b'$ in the standards B. The slots in the standards B, braces C, and arms B all extend to the ends of their respective pieces, so that, by simply loosening the nuts on the bolts $b''$, the standards may be adjusted at different elevations on, and angles to, the tongue, while the braces C admit of adjustment in the same manner, and, when desired, the standards and braces may be removed, and the plows and arms $d$ substituted therefor by simply loosening the nuts on the bolts $b''$, in the same manner. E is the draft-bar, and consists of a rigid bar, projecting laterally from near the forward end of the tongue A, and may be stayed by a brace, $e$, or otherwise. F is a handle, projecting laterally from the forward end of the tongue A, and parallel with the draft-bar E. G is a handle projecting laterally from the tongue A on its opposite side from the handle F, and in the rear of the draft-bar E. The handle G is connected to the tongue A by a yoke, $g$, which passes around the tongue, and has its ends pivoted, by a bolt, $g'$, to the handle. The pivoted end of the handle G is formed eccentric to the pivot-bolt $g'$, so that it may be turned outward, as shown by full lines at Fig. 2, to secure it in working position, or turned down, as shown by dotted lines at same figure, to release it for adjustment at any desired location on the tongue A, and between the draft-bar E and the forward end of the first standard-brace.

In operation, the operator may exert great force or draft with comparative ease to himself by placing the draft-bar E against his hip, and, by means of the handles F and G, he may readily and easily keep the machine in proper working position, raising and lowering it, and controlling its lateral movements through difficult places with facility and certainty.

Having thus described our invention, what we claim as new, and desire to secure by Letters Patent, is—

1. In a hand-cultivator, the combination of the pivoted and adjustable handle G with the tongue A and fixed handle F, substantially as and for the purpose specified.

2. In a hand-cultivator, the combination of the pivoted and adjustable handle G, fixed handle F, and draft-bar E, substantially as and for the purpose specified.

In testimony that we claim the foregoing as our invention, we have hereunto affixed our signatures.

JOSHUA PIERPONT.
SIDNEY S. TUTTLE.
CHARLES B. TOMPKINS.

Witnesses for PIERPONT and TUTTLE:
J. M. WENDELKEN,
W. J. PIERPONT.

Witnesses for CHAS. B. TOMPKINS:
E. T. CAMPBELL,
F. M. DYCKES.